United States Patent
MacKinnon et al.

[19]

[11] Patent Number: 6,154,472
[45] Date of Patent: Nov. 28, 2000

[54] HIGH EFFICIENCY DECOUPLED TUNING CONFIGURATION INTRACAVITY DOUBLED LASER AND METHOD

[75] Inventors: Neil MacKinnon; Ping Xie, both of San Jose, Calif.

[73] Assignee: JDS Uniphase Corporation, San Jose, Calif.

[21] Appl. No.: 09/150,436

[22] Filed: Sep. 9, 1998

Related U.S. Application Data

[63] Continuation-in-part of application No. 08/947,203, Oct. 8, 1997, Pat. No. 5,949,802.

[51] Int. Cl.[7] .......................................... H01S 3/10
[52] U.S. Cl. .................................................. 372/22
[58] Field of Search ................................ 372/22, 92, 21, 372/98

[56] References Cited

U.S. PATENT DOCUMENTS

| | | |
|---|---|---|
| 5,206,867 | 4/1993 | Esterwitz . |
| 5,263,038 | 11/1993 | Lukas et al. ............................. 372/22 |
| 5,809,048 | 9/1998 | Shichijyo et al. ....................... 372/22 |
| 5,854,802 | 12/1998 | Jin et al. ................................. 372/22 |
| 5,905,748 | 5/1999 | Xie ......................................... 372/22 |
| 5,946,338 | 8/1999 | Bettman ................................. 372/22 |
| 5,960,015 | 9/1999 | Xie ......................................... 372/22 |

*Primary Examiner*—Leon Scott, Jr.
*Attorney, Agent, or Firm*—Michael Pritzkau; Stephen C Shear

[57] ABSTRACT

As will be described in more detail hereinafter, an intracavity doubled single longitudinal mode laser is disclosed which provides stable (i.e., low amplitude variation in its output beam intensity), efficient operation in conjunction with a highly advantageous decoupled alignment configuration. An associated method is also disclosed. A lasant material is positioned in the light path of the laser for producing light at a desired fundamental wavelength and possibly other, unwanted wavelengths. Polarizing means is also positioned in the light path for polarizing the desired fundamental wavelength and the unwanted wavelengths of light. In addition to the polarizing means, birefringent means is positioned in the light path on one side of the polarizing means for selectively subjecting the unwanted wavelengths to losses in cooperation with the polarizing means such that the unwanted wavelengths are extinguished while the desired fundamental wavelength is subjected to a level of loss above a lasing threshold so that the desired fundamental wavelength lases. A type I doubling material is adjustably arranged in the light path for producing the doubled frequency light at twice the frequency of the desired fundamental frequency passing therethrough and for adjustment of phase matching which establishes an efficiency at which the doubled light frequency is produced. The birefringent means and the type I doubling material are arranged on opposite sides of the polarizing means along the light path so as to substantially decouple wavelength selection performed by adjusting the birefringent means from the phase matching adjustment performed by adjusting the type I doubling material.

11 Claims, 1 Drawing Sheet

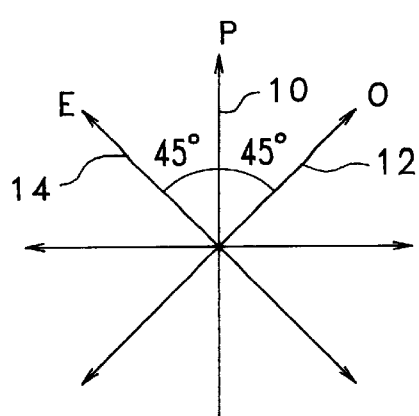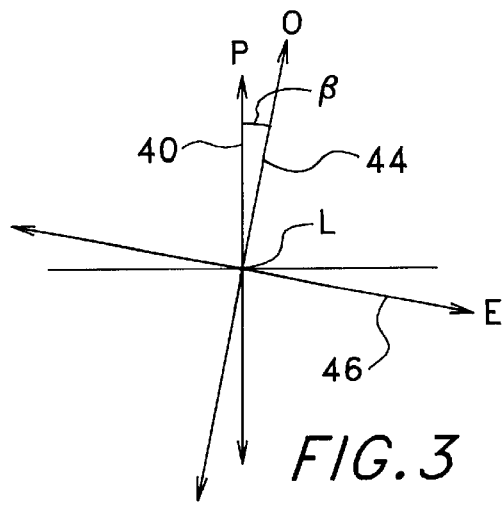
FIG. 1
(PRIOR ART)
FIG. 3
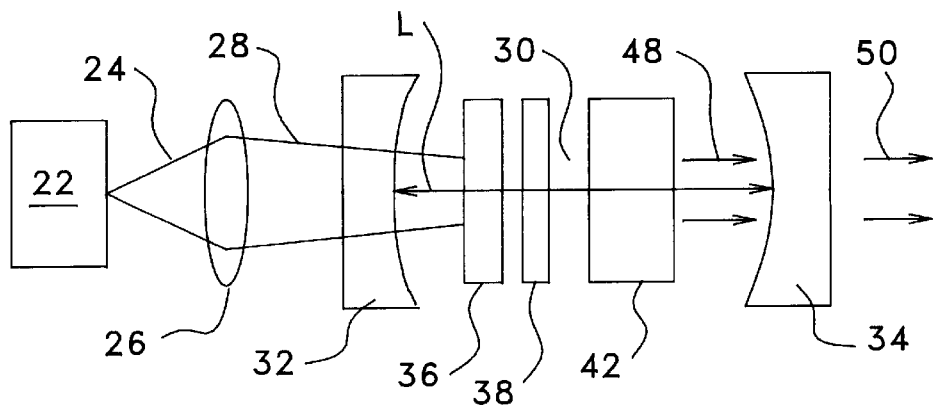
FIG. 2
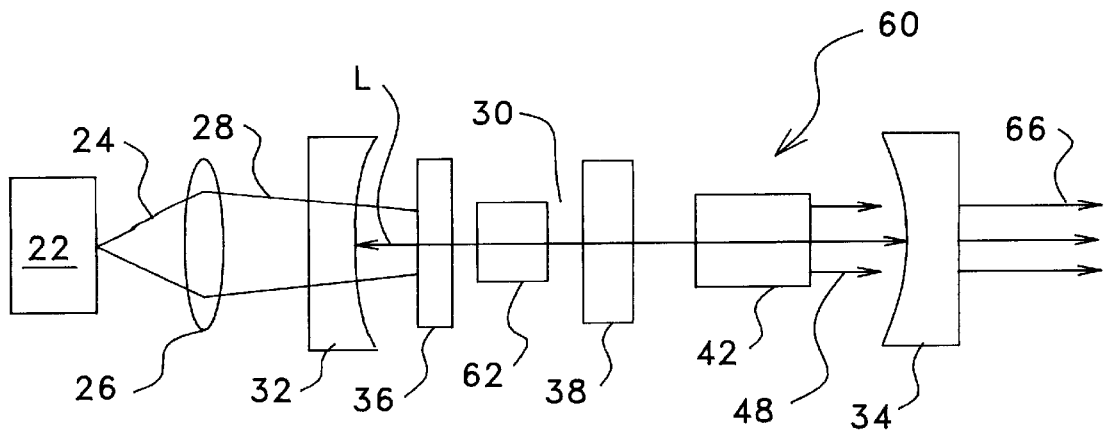
FIG. 4

HIGH EFFICIENCY DECOUPLED TUNING CONFIGURATION INTRACAVITY DOUBLED LASER AND METHOD

CROSS-REFERENCE TO RELATED APPLICATION

The present application is a continuation-in-part of U.S. patent application Ser. No. 08/947,203, entitled "HIGH EFFICIENCY INTRACAVITY DOUBLED LASER AND METHOD", filed Oct. 8, 1997 U.S. Pat. No. 5,949,802, which is incorporated herein by this reference.

BACKGROUND OF THE INVENTION

The present invention relates generally to intracavity doubled single mode lasers and more particularly to an intracavity doubled single mode laser implementation which exhibits high efficiency in converting light from a fundamental frequency to a doubled, visible frequency and which provides for highly advantageous decoupled alignment adjustments. The invention is particularly well suited for efficiently producing visible light in the blue frequency range.

In the prior art, a variety of intracavity doubled lasers have been developed. However, many of these frequency doubled lasers suffer a so called "green noise" problem which limits their usefulness in a number of applications. More specifically, the green noise problem introduces amplitude noise (i.e. variation in the intensity of the output beam at the doubled frequency) which is believed to be due to gain competition between multiple modes which lase in the laser's resonant cavity in combination with a longitudinal mode coupling phenomenon between the lasing modes which is a consequence of a nonlinear doubling process.

One popular approach in solving the green noise problem is to limit the lasing modes in the laser to a single longitudinal mode. The single mode then excites the nonlinear material to produce a single, doubled output frequency. However, as will be seen hereinafter, certain problems have been encountered with regard to use of a single longitudinal mode laser (hereinafter SLM) in efficiently producing light at particular frequencies such as, for example, that of blue.

Referring to FIG. 1, as mentioned, one approach for producing a stable output beam at a doubled frequency in accordance with the prior art is to excite a nonlinear material with a single longitudinal mode. In a specific implementation (the physical elements of which are not shown), a type II birefringent nonlinear material cooperates with a polarizing element so as to reject all but a desired fundamental wavelength. FIG. 1 illustrates, in this implementation, the well known orientation of the polarizing element's polarization axis 10 with respect to the ordinary axis 12 and extraordinary axis 14 of the birefringent type II nonlinear material. Specifically, ordinary axis 12 and extraordinary axis 14 are each oriented at an angle of 45° with respect to polarization axis 10. In this way, a Lyot filter is formed in the laser's cavity which serves to discriminate against all but one desired fundamental frequency while providing low insertion loss for the desired mode. It should be appreciated that, in order to achieve useful output power, this implementation is most appropriate in applications where a reasonably efficient nonlinear type II doubling material is available for use at the wavelengths of concern. For example, green output light at 532 nm may be produced with relative efficiency from a 1064 nm fundamental wavelength using type II KTP. Unfortunately, however, the efficient production of blue output light using type II configured materials is complicated by the fact that the effective nonlinear doubling coefficient is much less in comparison with that in type II KTP for the green at 532 nm.

In order to compensate for this lower optical gain, it is desirable to use much more efficient doubling materials. At first appearance, it would seem that certain doubling materials such as, for example, potassium niobate ($KNbO_3$) would serve well in a high efficiency conversion role since this material possesses an effective doubling efficiency for blue interactions which is greater than thirty times that of KTP in green interactions. However, $KNbO_3$ will only phase match blue interactions in a type I configuration such that it is not useful in the orientation of FIG. 1. Therefore, type I doubling materials must be used in other geometries, as will be described immediately hereinafter. These other geometries are typically inefficient as a result of additional intracavity components which constrain the laser to SLM operation. As an example, intracavity etalons are currently the component of choice for defining SLM operation. In most instances, etalons introduce excessive and undesirable insertion losses which significantly reduce the laser's visible light output power. Moreover, intracavity etalons do not constrain the polarization state of the laser in a precise way, thereby reducing the etalon's effectiveness in cases where the gain material being used does not exhibit sufficient gain anisotropy.

Other implementations may also employ type I doubling materials. Examples include "twisted mode" cavity designs, in which a combination of intracavity waveplates is used, and ring lasers. These implementations normally embody complex design considerations and geometries. Ring lasers, in particular, are difficult to align.

As will be seen hereinafter, the present invention provides a heretofore unseen and highly advantageous intracavity geometry and associated method which utilizes a type I doubling material in a way that provides stable SLM operation, high efficiency and predictable tuning behavior.

SUMMARY OF THE INVENTION

As will be described in more detail hereinafter, an intracavity doubled single longitudinal mode laser is disclosed which provides stable (i.e., low amplitude variation in its output beam intensity), efficient operation in conjunction with a highly advantageous decoupled alignment configuration. An associated method is also disclosed. The laser includes an input mirror and an output mirror defining a resonant cavity and a light path within the resonant cavity and between the mirrors with the output mirror being substantially transparent to a doubled output frequency produced within the cavity. A lasant material is positioned in the light path for producing light at a desired fundamental wavelength and possibly other, unwanted wavelengths. Polarizing means is also positioned in the light path for polarizing the desired fundamental wavelength and the unwanted wavelengths of light. In addition to the polarizing means, birefringent means is positioned in the light path on one side of the polarizing means for selectively subjecting the unwanted frequencies to certain losses while subjecting the desired fundamental frequency to other losses such that the unwanted frequencies are extinguished as a result of the certain losses while the other losses to which the desired fundamental frequency is subjected permit the desired fundamental frequency to remain above a lasing threshold so that the desired fundamental frequency lases. A type I doubling material is adjustably arranged in the light path for producing the doubled frequency light at twice the frequency of the desired fundamental frequency passing therethrough and for adjustment of phase matching which establishes an efficiency at which the doubled light frequency is produced. The birefringent means and the type I doubling material are arranged on opposite sides of the polarizing means along the light path such that any light passing through the doubling material at the fundamental wavelength includes a known polarization so as to substantially decouple wavelength selection performed by adjusting the birefringent means from the phase matching adjustment performed by adjusting the type I doubling material.

BRIEF DESCRIPTION OF THE DRAWINGS

The present invention may be understood by reference to the following detailed description taken in conjunction with the drawings briefly described below.

FIG. 1 is a diagrammatic representation looking in one direction along the light path of a prior art laser which uses a type II birefringent doubling material in combination with a polarizing element illustrating a relationship between the ordinary and extraordinary axes of the type II material and the polarizing axis of the polarizing element.

FIG. 2 is a diagrammatic view of a intracavity doubled high efficiency laser manufactured in accordance with the present invention.

FIG. 3 is a diagrammatic representation looking in one direction along the light path of the laser of FIG. 2 illustrating a relationship between a polarizing axis of a polarizing element in relation to a primary/ordinary axis of a type I birefringent doubling material in accordance with the present invention.

FIG. 4 is a diagrammatic view of an intracavity doubled, high efficiency laser, manufactured in accordance with the present invention, which includes a highly advantageous decoupled alignment configuration.

DETAILED DESCRIPTION OF THE INVENTION

Attention is immediately directed to FIG. 2, which diagrammatically illustrates one embodiment of an intracavity doubled single mode laser manufactured in accordance with the present invention and generally indicated by the reference numeral 20. Laser 20 includes a pumping light source 22 which emits a pump beam 24 at a predetermined frequency. Pump beam 24 is directed into a lens 26 and emerges therefrom to form a beam 28. Beam 28 then passes into a resonant cavity 30 through an input mirror 32 which is designed to be highly transmissive at the predetermined frequency of the pumping source while being highly reflective to a fundamental lasing wavelength. An opposing end of the resonant cavity is defined by an output mirror 34. Resonant cavity 30 defines a lasant light path L between the input and output mirrors. It is mentioned that light path L is depicted as being straight for purposes of clarity, however, the light path is not typically straight as a result of the various optical elements disposed along its length.

Continuing to refer to FIG. 2, output mirror 34 is designed to be highly reflective to the fundamental lasing wavelength while being highly transmissive to a frequency at or near double the frequency of the fundamental wavelength. After passing through the input mirror, light beam 28 is incident upon a laser gain medium 36.

Still referring to FIG. 2, pumping light source 22 may be provided in a variety of different forms so long as it produces or emits pump beam 24 at the predetermined frequency which is matched to the absorption of the material used as the laser gain medium, as is well known. In one embodiment, a laser diode which emits light at a wavelength at or about 808 nm is used as pumping light source 22. As is well known in the art, laser diodes of this type are readily available. When directed into laser gain medium 36, pump beam 24 excites atomic laser transitions within the laser gain medium which cause the material to produce a range of frequencies/wavelengths in resonant cavity 21 including a desired fundamental frequency as well as other, unwanted frequencies. The fundamental and output frequencies of laser 20 can vary depending upon the specific materials used as the laser gain medium. For purposes of simplicity, the remaining discussion will consider the use of Nd:YAG (neodymium doped YAG) as the laser gain medium with a central fundamental wavelength of 946 nm. However, with the application of the principles described herein, the use of other materials for the laser gain medium will be clear to those of skill in the art in view of this overall disclosure.

Referring to FIG. 3 in conjunction with FIG. 2, a polarizing element 38 such as, for example, a brewster plate or a prism is positioned along light path L such that the fundamental frequencies emitted by the gain material are polarized along a polarization axis 40. It should be understood that any suitable form of polarizing element may be utilized in accordance with the teachings herein. In accordance with the present invention, a type I birefringent nonlinear material 42 is also positioned along light path L. Material 42 includes an ordinary/primary axis 44 and an extraordinary axis 46. As seen in FIG. 3, ordinary axis 44 is oriented so as to be generally transverse to light path L (extending perpendicular to the plane of the figure) while forming an angle β relative to polarization axis 40. Remarkably, it has been empirically discovered that with a relatively small value for β, for example, in the range of 1° to 5°, polarizing element 38 and material 42 cooperate in a way which forms a Lyot filter within resonant cavity 30. It is to be understood that the specified approximate range of β is intended only as exemplary, rather than limiting and that any angle is suitable for use provided only that the desired Lyot effect results. In practicing the present invention, β should be gradually increased only to a point at which sufficient birefringence is introduced in order to establish Lyot filter action. Thereafter, tuning techniques such as, for example temperature tuning are used to select the desired fundamental lasing frequency which, in turn, establishes the doubled output frequency. It is to be understood that the above described arrangement may be varied in any suitable way in accordance with the teachings herein so long as a Lyot filter is defined. For example, ordinary axis 44 may readily be positioned on the opposite side of polarization axis 40 at angle β. Moreover, it should be emphasized that β defines only the relative association between the polarization axis and the ordinary axis of the type I material. Additionally, ordinary axis 44 is preferred to form a slight angle (not shown) off normal with light path L in a known manner so as to minimize coupled cavity and intracavity etalon effects. It is noted that all intracavity optical surfaces should be arranged slightly off normal with respect to light path L for the same reason.

In conventional lasers, type I birefringent materials are typically oriented for maximum conversion efficiency. That is, the ordinary or extraordinary axis of the type I material is arranged parallel with a polarization axis defined within the cavity. In such an orientation, no frequency discrimination is provided by these elements via the Lyot effect. That is, such an implementation will provide a multi-mode, generally unstable output. One might assume that frequency discrimination could be provided in such a parallel axis orientation through the simple expedient of adding an intracavity waveplating element adjacent to the type I material as a way of forming a Lyot filter to simulate the above described type II doubling regime. Unfortunately, however, it is submitted that the birefringence of the type I material, in such a configuration, may serve to cancel out the frequency selective depolarization behavior of the type II waveplate. The result will be a very complex interaction between the type I and waveplate materials in which SLM operation will not be achieved. As will be seen below, the configuration of the present invention permits the use of a combination of type I doubling material and a birefringent crystal, serving as a waveplate, while avoiding the problem of setting up a complex interaction between these two elements.

In one aspect, the present invention recognizes that detuning the ordinary axis of Type I material 42 slightly off of polarization axis 40 results in a slight degradation in conversion efficiency (which is minimized by reducing β, as described above), but causes the range of fundamental frequencies possible within the laser cavity to be subjected to the birefringence of the type I material. In this way, the birefringence of the type I material cooperates with polarizing element 38 to provide Lyot filter action with its associated and highly advantageous low insertion loss. As an example, since loss in conversion efficiency due solely to detuning the Type I material is roughly proportional the fourth power of the cosine of β, a loss of less than 2% is experienced for a β=5°. Thus, an intracavity doubled SLM laser is provided at wavelengths such as, for example, that of blue light with an efficiency which has not been seen heretofore at such wavelengths.

It should be appreciated that the operation of laser 20 may be described in essentially the same terms as a prior art laser which uses a type II material in defining a Lyot filter. Specifically, only one desired fundamental wavelength remains unchanged in polarization (retaining polarization along polarization axis 40 of polarizing element 38) after having passed through type I material 42. Precise adjustment of the desired wavelength may be obtained in a known manner, for example, by temperature tuning. Therefore, the desired fundamental wavelength experiences a level of loss in combination with gain provided by gain material 36 which permits the desired wavelength to lase along light path L by remaining above a lasing threshold. Of course, as the desired fundamental passes through type I material 42, frequency doubled light 48 is generated with a high conversion efficiency in an overall efficient and heretofore unseen intracavity geometry, as described above. Since output mirror 34 is highly transmissive at the doubled frequency, frequency doubled light 48 passes through the output mirror as output light 50.

With regard to the unwanted fundamental wavelengths/modes, it should be appreciated that type I material 42 is selected to provide full or half-wave retardation at the desired fundamental wavelength. Any unwanted (unselected) mode present within cavity 30 will have a wavelength such that the unwanted mode will not experience a half-wave or full-wave retardation through birefringent member 28. Therefore, a round-trip through material 42 will result in polarization changes for these unwanted modes. Upon passing through polarizing element 38, the unwanted modes will experience substantial losses as a result of the polarization changes. These losses, in spite of gain provided by gain material 36, will result in power levels for the unwanted modes which place them below lasing threshold such that they are ultimately extinguished over a number of roundtrips within cavity 30.

It should be appreciated that laser 20 of FIG. 2 is particularly advantageous with regard to polarization of light along light path L. Specifically, polarization of the fundamental wavelength is established by polarizing element 38. For this reason, the polarization of light at the lasing, fundamental wavelength passing through non-linear material 42 in either direction is known. Moreover, no other components are present along light path L (i.e., birefringent components) which would disturb this known polarization. The advantage obtained as a result of this known polarization will become even more evident below with the description of another embodiment of the present invention. In this regard, many prior art configurations utilize a birefringent element which serves as a waveplate for rejection of unwanted wavelengths. However, as noted above, the presence of such a birefringent element immediately adjacent the non-linear material generally introduces a complex interaction between the type I doubling material and the birefringent material. This interaction results in undesirable and unpredictable changes in polarization which adversely reduce the amplitude of the laser's output wavelength and which result in difficulties when aligning the laser during the manufacturing process. Remarkably, however, the problem has been overcome using a particular geometry to be described immediately hereinafter.

Attention is now directed to FIG. 4 which diagrammatically illustrates another embodiment of an intracavity doubled single mode laser manufactured in accordance with the present invention and generally indicated by the reference numeral 60. Because laser 60 includes certain components which are also used by previously described laser 20, like reference numbers have been applied wherever possible and detailed descriptions of such like components have not been repeated for purposes of brevity. However, laser 60 is unlike laser 20 in two important ways. First, type I doubling material 42 is oriented for maximum doubling efficiency. That is, previously described angle β (FIG. 3) is equal to zero, in this instance, such that light which passes through the crystal at the selected polarization, as determined by polarizing element 38, is not subjected to the birefringence of the doubling crystal. Second, a birefringent crystal 62 is positioned on the opposite side of polarizing means 38 with respect to doubling crystal 42. Birefringent crystal 62 may be formed, for example, from calcite, orthovanadate, quartz or any other suitable such material.

It should be appreciated that, in view of not subjecting the unwanted wavelengths of light to the bierfringence of non-linear material 42, an alternative means must be provided to facilitate rejection of the unwanted wavelengths. Birefringent crystal 62 cooperates with polarizing element 38 in a way which provides the desired wavelength selection. Specifically, crystal 62 includes a predetermined length along light path L which provides full or half wave retardation at a desired fundamental wavelength. Crystal 62 also includes an ordinary axis and an extraordinary axis (neither of which is shown). In the configuration of laser 60, the ordinary and extraordinary axis of crystal 62 should be arranged at an angle of approximately 45° with respect to the polarization axis of polarizing element 38. In this manner, Lyot filter action will occur whereby discrimination is provided against all but one desired wavelength while, at the same, time the insertion loss associated with the birefringent crystal is low for the desired wavelength. Since only one polarization component of that wavelength is able to pass through polarizing element 38, that particular polarization component will retrace along light path L, experience gain greater than losses resulting in an overall gain above a lasing threshold and, therefore, lase. All unwanted wavelengths will be subjected to levels of loss through the cooperation of the polarizing element and crystal 62 which will cause the unwanted wavelengths to be extinguished. While the arrangement of FIG. 1 is similar as to orientation of the various axes, it should be remembered that FIG. 1 is associated with the use of a type II nonlinear doubling material in configuration which is completely different than that of the present invention.

Still referring to FIG. 4, it should be appreciated that the configuration of laser 60 is highly advantageous with respect to the alignment process which is required in the manufacture of any laser. In particular, the configuration of laser 60 serves to decouple phase matching performance and adjustments from wavelength selection adjustments. The decoupled effect is achieved due to positioning birefringent crystal 62 and doubling crystal 42 on opposite sides of polarizing element 38. As a result, the polarization of light at the desired fundamental, as defined by the polarization axis of polarizing element 38, is constant as it passes through doubling crystal 42. Therefore, phase matching adjustments performed, for example, by rotating or tilting doubling material 42 are essentially unaffected by other adjustments made using birefringent crystal 62 for purposes of wavelength selection. Hence, ease of manufacture is facilitated by the decoupled alignment adjustment configuration of the present invention in that a high degree of predictability is present in the behavior of the laser during the alignment procedure.

It should be mentioned that configurations (not shown) placing a birefringent crystal immediately adjacent to the non-linear doubling material are considered as disadvantageous in accordance with the present invention since alignment adjustments may readily act in an unpredictable manner. That is, an interaction is present between the non-linear material and the birefringent crystal in which phase matching adjustments may also affect wavelength selection and vice versa. In such an environment, an alignment procedure may become, in essence, a frustrating and time consuming guessing game. In accordance with the teachings herein, the interaction problem has been resolved with a highly advantageous and heretofore unseen configuration.

Since the laser assemblies disclosed herein may be provided in a variety of different configurations and produced using a number of different methods, it should be understood that the present invention may be embodied in many other specific forms without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In an intracavity doubled single longitudinal mode laser for producing a doubled frequency light from a fundamental frequency light, said laser including (i) an input mirror and an output mirror defining a resonant cavity and a light path within the resonant cavity and between the mirrors, said output mirror being substantially transparent to said doubled frequency light produced within the cavity, (ii) a lasant material positioned in said light path for producing light at a desired fundamental frequency and other, unwanted frequencies, and (iii) means positioned in said light path for polarizing said desired fundamental frequency light and said unwanted frequencies of light, the improvement comprising:

a birefringent means and a type I doubling material arranged on opposite sides of said polarizing means along said light path such that any light passing through the doubling material at said fundamental wavelength includes a known polarization so as to substantially decouple wavelength selection performed by adjusting said birefringent means from a phase matching adjustment performed by adjusting the type I doubling material.

2. The improvement according to claim 1 wherein said type I doubling material is positioned between said polarizing means and said output mirror.

3. An intracavity doubled single longitudinal mode laser for producing a doubled frequency light from a fundamental frequency light, said laser comprising:

a) an input mirror and an output mirror defining a resonant cavity and a light path within the resonant cavity and between the mirrors, said output mirror being substantially transparent to said doubled frequency light produced within said cavity;

b) a lasant material positioned in said light path for producing light at a desired fundamental wavelength and other, unwanted wavelengths;

c) means positioned in said light path for polarizing said desired fundamental wavelength light and said unwanted wavelengths of light;

d) birefringent means adjustably positioned in said light path on one side of said polarizing means and cooperating with the polarizing means for selectively subjecting the unwanted wavelengths to certain losses while subjecting the desired fundamental to other losses such that the unwanted wavelengths are extinguished as a result of said certain losses while the other losses to which the desired fundamental wavelength is subjected permit the desired fundamental wavelength to remain above a lasing threshold so that the desired fundamental wavelength lases; and e) a type I doubling material adjustably arranged in said light path and positioned on the opposite side of said polarizing means with respect to said birefringent means for producing said doubled frequency light at twice the frequency of said desired fundamental wavelength passing therethrough with an efficiency which is established by a phase matching adjustment such that any light passing through the doubling material at said fundamental wavelength includes a known polarization so as to substantially decouple wavelength selection performed by adjusting said birefringent means from the phase matching adjustment performed by adjusting the type I doubling material.

4. The laser of claim 3 wherein said type I doubling material is positioned between said polarizing means and said output mirror.

5. The laser of claim 3 wherein said type I doubling material is oriented for maximum phase matching using said phase matching adjustment so as to maximize the generation of said doubled frequency light.

6. The laser of claim 3 wherein said birefringent means includes an ordinary axis and an extraordinary axis arranged generally transverse to said light path, and said polarizing means includes a polarization axis arranged generally transverse to said light path and wherein the ordinary axis and the extraordinary axis of the birefringent means are arranged at approximately 45° with respect to the polarization axis of the polarizing means.

7. The laser of claim 3 wherein said type I doubling material is configured for producing said output light as blue light.

8. The laser of claim 3 wherein said polarizing means includes a Brewster plate.

9. A method of producing an intracavity doubled single longitudinal mode laser, said method comprising the steps of:
   a) providing an input mirror and an output mirror defining a resonant cavity and a light path within the resonant cavity and between the mirrors, said output mirror being substantially transparent to a doubled frequency light produced within the cavity from a desired fundamental frequency light;
   b) locating a lasant material in said light path for producing light at said desired fundamental frequency and other, unwanted frequencies;
   c) positioning polarizing means in said light path for polarizing any light present on the light path;
   d) placing birefringent means along said light path on one side of said polarizing means arranged for cooperating with the polarizing means in an adjustable manner to selectively subject the unwanted frequencies to certain losses while subjecting the desired fundamental frequency to other losses such that the unwanted frequencies are extinguished as a result of said certain losses while the other losses to which the desired fundamental frequency is subjected permit the desired fundamental frequency to remain above a lasing threshold so that the desired fundamental frequency lases; and
   e) arranging a type I doubling material along said light path on the opposite side of said polarizing means with respect to said birefingent means for producing said doubled frequency light at twice the frequency of any frequencies passing therethrough with an efficiency which is established by a phase matching adjustment such that any light passing through the doubling material at said fundamental wavelength includes a known polarization so as to substantially decouple wavelength selection performed by adjusting said birefringent means from the phase matching adjustment performed by adjusting the type I doubling material.

10. The method of claim 9 further including the step of
    f) performing the phase matching adjustment of said type I material to maximize the production of said doubled frequency light from said desired fundamental wavelength.

11. The method of claim 10 wherein said birefringent material includes an ordinary axis and an extraordinary axis and said polarizing means includes a polarization axis and wherein said method further includes the step of:
    g) adjusting the birefringent means such that the ordinary axis and the extraordinary axis of the birefringent means are at an angle of approximately 45° with respect to the polarization axis of the polarizing means.

\* \* \* \* \*